United States Patent
Gerstmair et al.

(10) Patent No.: US 12,386,031 B2
(45) Date of Patent: Aug. 12, 2025

(54) CORRECTION OF PHASE DEVIATIONS IN THE ANALOG FRONTEND OF RADAR SYSTEMS

(71) Applicant: Infineon Technologies AG, Neubiberg (DE)

(72) Inventors: Michael Gerstmair, Langenstein (AT); Michael Petit, Linz (AT); Josef Kulmer, Graz (AT); Julian Mitterlehner, Niederanna (AT); Dominik Breuer, Luftenberg an der Donau (AT); Alexander Girlinger, Niederkappel (AT)

(73) Assignee: Infineon Technologies AG, Neubiberg (DE)

( * ) Notice: Subject to any disclaimer, the term of this patent is extended or adjusted under 35 U.S.C. 154(b) by 406 days.

(21) Appl. No.: 17/809,448

(22) Filed: Jun. 28, 2022

(65) Prior Publication Data
US 2023/0016890 A1    Jan. 19, 2023

(30) Foreign Application Priority Data
Jul. 9, 2021    (DE) .......................... 102021117775.8

(51) Int. Cl.
*G01S 7/40*    (2006.01)
*G01S 13/931*    (2020.01)

(52) U.S. Cl.
CPC .............. *G01S 7/40* (2013.01); *G01S 13/931* (2013.01); *G01S 2013/93271* (2020.01)

(58) Field of Classification Search
CPC . G01S 7/40; G01S 13/931; G01S 2013/93271
See application file for complete search history.

(56) References Cited

U.S. PATENT DOCUMENTS

| 5,581,517 A | * | 12/1996 | Gee | ................. | G01S 7/5209 |
| | | | | | 367/138 |
| 11,082,076 B2 | * | 8/2021 | Aletsee | ................. | H03M 1/124 |

(Continued)

FOREIGN PATENT DOCUMENTS

| CN | 211786076 U | * | 10/2020 | | |
| DE | 102017127416 A1 | * | 6/2018 | ......... | G01R 31/2822 |

(Continued)

*Primary Examiner* — Vladimir Magloire
*Assistant Examiner* — Maxine McKenzie Phillips
(74) *Attorney, Agent, or Firm* — Harrity & Harrity, LLP (57) ABSTRACT

According to a further example implementation, the method comprises measuring magnitude response information relating to an analog baseband signal processing chain of a reception channel of a radar system, determining—based on the measured magnitude response information—at least one value which characterizes at least one frequency limit of the first baseband signal processing chain, and determining a phase response for the baseband signal processing chain based on the at least one value and a model of the baseband signal processing chain. The method also comprises digitizing an output signal from the baseband signal processing chain and digitally processing the digitized output signal, wherein phase equalizing is carried out based on the determined phase response during normal radar operation of the radar system.

20 Claims, 6 Drawing Sheets

(56) References Cited

U.S. PATENT DOCUMENTS

| | | | |
|---|---|---|---|
| 11,536,802 B2 * | 12/2022 | Mayer | G01S 7/4008 |
| 2003/0011353 A1 * | 1/2003 | Whitehead | H02H 1/0092 |
| | | | 324/76.52 |
| 2020/0174098 A1 * | 6/2020 | Lang | G01S 7/4008 |

FOREIGN PATENT DOCUMENTS

| | | | | |
|---|---|---|---|---|
| DE | 102019110525 A1 | | 10/2020 | |
| RU | 2443058 C2 * | | 2/2012 | |
| WO | WO-2008017617 A1 * | | 2/2008 | G01S 13/756 |
| WO | WO-2008088868 A2 * | | 7/2008 | A61B 3/102 |
| WO | WO-2011088907 A1 * | | 7/2011 | G01S 19/13 |

* cited by examiner

CORRECTION OF PHASE DEVIATIONS IN THE ANALOG FRONTEND OF RADAR SYSTEMS

CROSS REFERENCE TO RELATED APPLICATION

This application claims priority to German Patent Application No. 102021117775.8 filed on Jul. 9, 2021, the content of which is incorporated by reference herein in its entirety.

TECHNICAL FIELD

The present description relates to the field of radar measurement technology and, in particular, to a concept for correcting production-related phase deviations in the analog frontend of radar systems.

BACKGROUND

Radar sensors are used in a multiplicity of applications to detect objects, wherein the detection usually comprises measuring distances and speeds as well as azimuth angles (Direction of Arrival, DoA) of the detected objects. In the automotive sector in particular, there is an increasing need for radar sensors which can be used, inter alia, in driving assistance systems (Advanced driver assistance systems, ADAS), for example in adaptive cruise control (ACC, or Radar Cruise Control) systems. Such systems can automatically adapt the speed of an automobile in order to thus comply with a safe distance from other automobiles driving in front (and from other objects and pedestrians). Further applications in the automotive sector are, for example, blind spot detection, lane change assist, collision warning systems, pedestrian detection and the like. In the field of autonomous driving, radar sensors and systems having a plurality of sensors will play an important role in controlling autonomous vehicles.

Modern radar systems use highly integrated RF circuits which can combine all core functions of an RF frontend of a radar transceiver in a single housing (Single-Chip Radar Transceiver). Such highly integrated RF circuits are usually referred to as MMICs. An RF frontend usually (but not necessarily) comprises, inter alia, a voltage-controlled oscillator (VCO) connected in a phase locked loop, power amplifiers (PA), directional couplers, mixers and associated control circuit arrangements for controlling and monitoring the RF frontend. An MIMIC may also have circuits for analog signal processing in the baseband (or an intermediate frequency band) and analog-to-digital converters (ADC) in order to enable digital signal processing. The RF frontend and the analog baseband signal processing chain are together also referred to as the "analog frontend".

In sensor applications, a plurality of MMICs may also be interconnected (cascaded), for example in order to emit and/or receive RF radar signals via a plurality of antennas. Such arrangements having a plurality of MMICs and a multiplicity of antennas can be used for beamforming techniques, for example. A plurality of transmission and reception antennas are also used, inter alia, when the direction of arrival (DoA) of the received radar echoes is intended to be determined. In order to enable a reliable measurement, not only the phases of the emitted RF radar signals must be in a defined relationship with respect to one another, but rather it must also be ensured that no undesirable phase shifts which could distort the measurement result are caused in the various reception channels. In particular in the case of reception channels distributed among a plurality of MMICs, production-related fluctuations in the analog frontend may result in different random phase deviations occurring in different reception channels. A cause of this are phase shifts in active or passive filters in the baseband which may be implemented using RC structures, for example. Component tolerances which are conventional for resistors and capacitors result in the filter characteristics and, in particular, their phase responses being different in different reception channels, which, as mentioned, can result in systematic measurement errors.

SUMMARY

The example implementations described here relate to a radar system and to a corresponding method for determining calibration data. According to one example implementation, the method comprises measuring magnitude response information relating to a first analog baseband signal processing chain of a first reception channel and relating to a second analog baseband signal processing chain of a second reception channel of a radar system. The method also comprises determining—based on the measured magnitude response information—a first value which characterizes a frequency limit of the first baseband signal processing chain and a second value which characterizes a corresponding frequency limit of the second baseband signal processing chain, and determining phase responses for the first and second baseband signal processing chains based on the first and second values and a model of the baseband signal processing chains. The method also comprises digitizing an output signal from the first baseband signal processing chain and an output signal from the second baseband signal processing chain, and compensating for differences in the phase responses of the first and second baseband signal processing chains using digital signal processing of the digitized output signals during normal radar operation of the radar system.

According to a further example implementation, the method comprises measuring magnitude response information relating to an analog baseband signal processing chain of a reception channel of a radar system, determining—based on the measured magnitude response information—at least one value which characterizes at least one frequency limit of the first baseband signal processing chain, and determining a phase response for the baseband signal processing chain based on the at least one value and a model of the baseband signal processing chain. The method also comprises digitizing an output signal from the baseband signal processing chain, and digitally processing the digitized output signal, wherein phase equalizing is carried out based on the determined phase response during normal radar operation of the radar system. Further example implementations relate to a radar system having one or more reception channels and having one or more computing units which are configured to carry out the methods described here.

BRIEF DESCRIPTION OF THE DRAWINGS

Example implementations are explained in more detail below based on figures. The illustrations are not necessarily true to scale and the example implementations are not only restricted to the aspects illustrated. Rather, importance is placed on presenting the principles on which the example implementations are based. In the figures.

DETAILED DESCRIPTION

Figure 1:
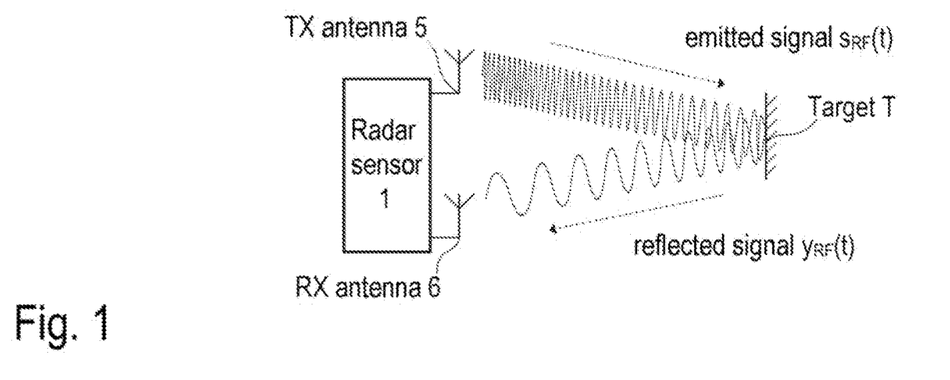
FIG. 1 is a diagram for illustrating the functional principle of an FMCW radar system for measuring distance and/or speed.

FIG. 1 illustrates the use of an FMCW radar system as a sensor for measuring distances and speeds of objects which are usually referred to as radar targets. In the present example, the radar apparatus 1 has separate transmission (TX) and reception (RX) antennas 5 and 6 (bistatic or pseudo-monostatic radar configuration). However, it should be noted that it is also possible to use an antenna which is simultaneously used as a transmission antenna and as a reception antenna (monostatic radar configuration). The transmission antenna 5 emits an RF signal $s_{RF}(t)$ which is frequency-modulated, for example, with a linear chirp signal (periodic, linear frequency ramp). The emitted signal $s_{RF}(t)$ is scattered back at the radar target T and the backscattered (reflected) signal $y_{RF}(t)$ is received by the reception antenna 6. FIG. 1 shows a simplified example; in practice, radar sensors are systems having a plurality of transmission (TX) and reception (RX) channels (in order to also be able to measure angles of arrival), and the emitted RF signals comprise sequences each with a multiplicity of chirps. Furthermore, the examples described here are not restricted to FMCW radar systems, but can also be used in other radar systems, for example in phase-modulated continuous-wave (PMCW) radar systems.

Figure 2:
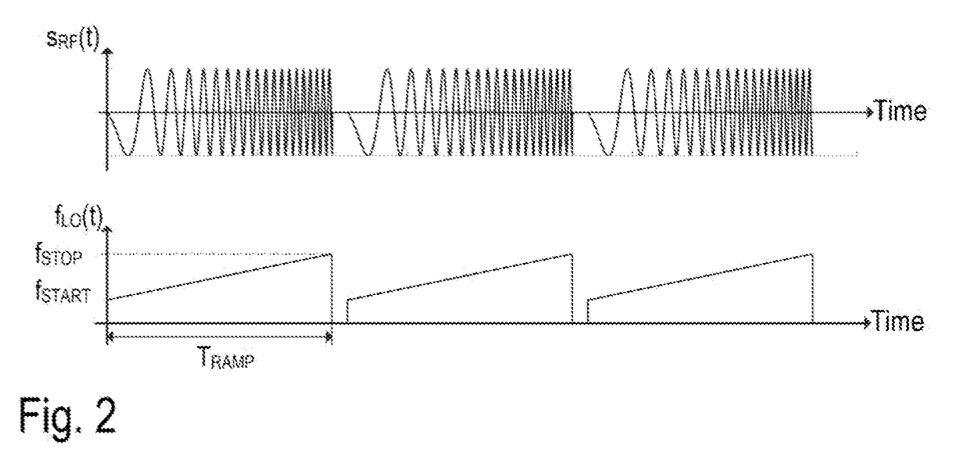
FIG. 2 comprises two time diagrams for illustrating the frequency modulation of the RF signal generated by the FMCW system.

FIG. 2 illustrates, by way of example, the mentioned frequency modulation of the signal $s_{RF}(t)$. As illustrated in FIG. 2, the signal $s_{RF}(t)$ is composed of a multiplicity of "chirps" (grouped in sequences). That is to say, the signal $s_{RF}(t)$ comprises a sequence of sinusoidal signal profiles (waveforms) with an increasing frequency (up-chirp) or a decreasing frequency (down-chirp) (see upper diagram in FIG. 2). In the present example, the instantaneous frequency f(t) of a chirp increases linearly, beginning at a starting frequency $f_{START}$, to a stop frequency $f_{STOP}$ within a period $T_{RAMP}$ (see lower diagram in FIG. 2). Such chirps are also referred to as "linear frequency ramps". FIG. 2 illustrates three identical linear frequency ramps. However, it should be noted that the parameters $f_{START}$, $f_{STOP}$, $T_{RAMP}$ and the pauses between the individual frequency ramps may vary. The frequency variation need not necessarily be linear either.

Figure 3:
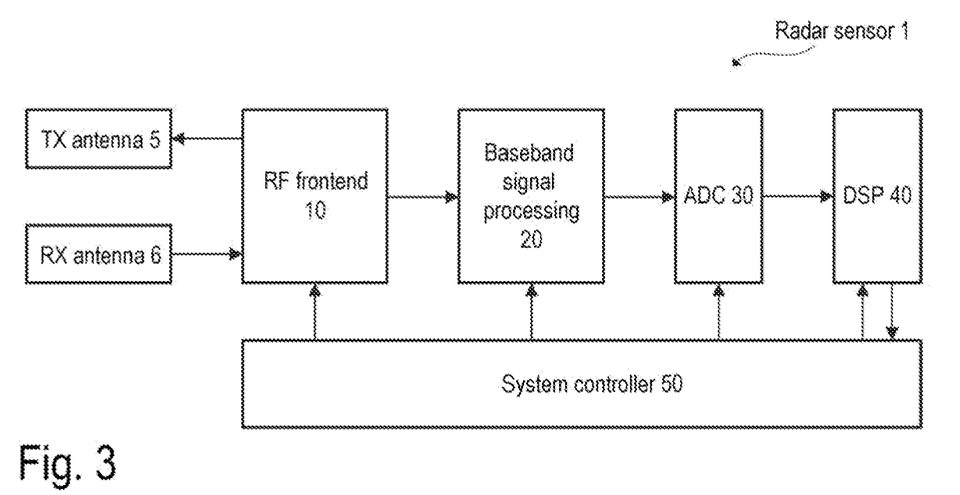
FIG. 3 is a block diagram for illustrating the fundamental structure of an FMCW radar system.

FIG. 3 is a block diagram which illustrates, by way of example, a possible structure of a radar apparatus 1 (radar sensor). Accordingly, at least one transmission antenna 5 (TX antenna) and at least one reception antenna 6 (RX antenna) are connected to an RF frontend 10 which is integrated in an MMIC and may comprise all those circuit components which are needed for the RF signal processing. These circuit components comprise, for example, a local oscillator (LO), RF power amplifiers, phase shifters, low-noise amplifiers (LNA), directional couplers (for example rat-race couplers, circulators, etc.) and mixers for downmixing the RF signals to baseband or an intermediate frequency band (IF band). In this description, no distinction is made between baseband and the IF band. The RF frontend 10 may—possibly together with further circuit components—be integrated in an MMIC (radar chip). The illustrated example shows a bistatic (or pseudo-monostatic) radar system having separate RX and TX antennas. In the case of a monostatic radar system, a single antenna would be used both to emit and to receive the electromagnetic (radar) signals. In this case, a directional coupler (for example a circulator) can be used to separate the RF signals to be emitted from the received RF signals (radar echoes).

As mentioned, radar systems in practice usually have a plurality of transmission and reception channels having a plurality of transmission and reception antennas, which makes it possible, inter alia, to measure the direction (DoA, direction of arrival) from which the radar echoes are received. This direction is usually represented by an angle (azimuth angle). In such MIMO systems, the individual TX channels and RX channels usually each have the same or a similar structure. That is to say, the radar frontend 10 may have a multiplicity of transmission and reception channels which may be distributed among a plurality of radar chips.

The RF signals emitted via the TX antennas may be, for example, in the range of approximately 20 GHz to 100 GHz (for example around 80 GHz in applications in the automotive sector). As mentioned, the RF signals received by the RX antennas comprise the radar echoes, that is to say those signal components which are scattered back at one or more radar targets. The RF signal ym'(t) received in a reception channel is downmixed to baseband and is processed further in the baseband using analog signal processing (see FIG. 3, analog baseband signal processing chain 20). The analog signal processing in the baseband substantially comprises filtering and possibly amplification of the baseband signal. The baseband signal is finally digitized (see FIG. 3, analog-to-digital converter 30) and is further processed in the digital domain.

The digital signal processing chain comprises a (digital) computing unit which may be at least partially implemented as software which can be executed on a processor, for example a microcontroller or a digital signal processor (see FIG. 3, DSP 40). The computing unit may also comprise hard-wired and one-time-programmable computing circuits. In this description, a computing unit is understood as meaning any functional unit which is suitable and is configured to carry out the calculations described here. The computing unit may also be distributed among a plurality of integrated circuits.

The overall system is generally controlled using a system controller 50 which may likewise be at least partially implemented as software which can be executed on a processor, for example a microcontroller. The RF frontend 10 and the analog baseband signal processing chain 20 (and optionally also the analog-to-digital converter 30 and parts of the digital signal processing) may be integrated together in a single MMIC (that is to say an RF semiconductor chip). Alternatively, the individual components may also be distributed among a plurality of integrated circuits. The system controller 50 is usually configured to communicate with the IVIMICs via a bus system (for example a Serial Peripheral Interface, SPI). In this manner, the system controller can configure and control the circuit components of the analog frontend which are contained in the MMICs.

Figure 4:
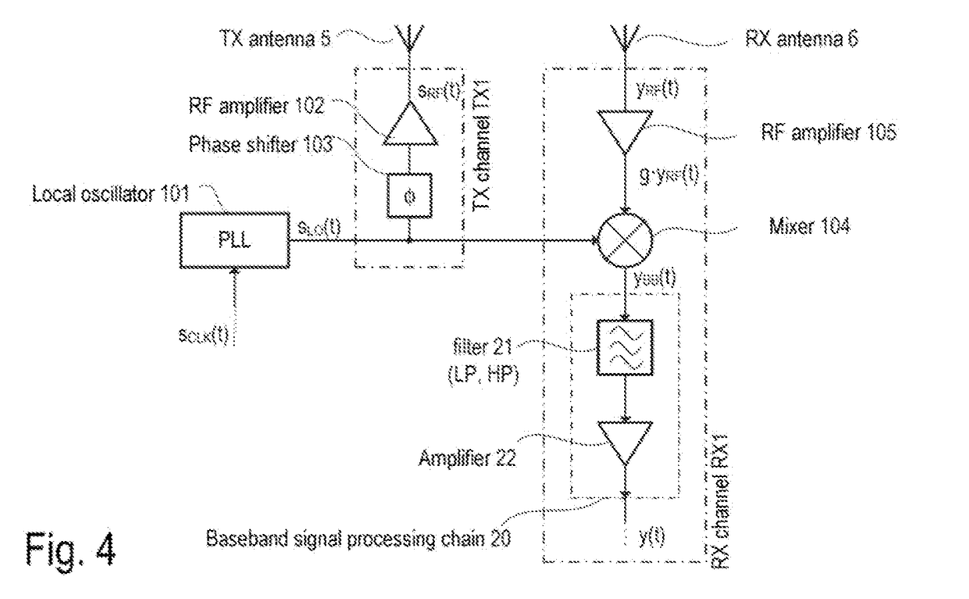
FIG. 4 is a simplified block diagram for illustrating an example implementation of a transmission channel and a reception channel of a radar system.

FIG. 4 shows an example implementation of the analog frontend (RF frontend 10 with a downstream baseband signal processing chain 20) which may be part of the radar system from FIG. 3. It should be noted that FIG. 4 illustrates a simplified circuit diagram in order to show the fundamental structure of the RF frontend having a transmission channel (TX channel TX1) and a reception channel (RX channel RX1). Actual implementations which may depend greatly on the specific application may naturally be more complex and generally have a plurality of TX and RX channels.

The RF frontend 10 comprises a local oscillator 101 (LO) which generates an RF oscillator signal $s_{LO}(t)$. As described above with reference to FIG. 2, the RF oscillator signal $s_{LO}(t)$ may be frequency-modulated during measurement operation and is also referred to as an LO signal. The LO 101 may also be configured for continuous-wave operation (CW operation), which may be necessary for a calibration measurement, for example. In radar applications, the LO signal is usually in the SHF (Super High Frequency, centimeter wave) or in the EHF (Extremely High Frequency, millimeter wave) band, for example in the range of 76 GHz to 81 GHz or in the 24 GHz ISM band (Industrial, Scientific and Medical Band) in some automotive applications.

The LO signal $s_{LO}(t)$ is processed both in the transmission signal path (in the TX channel) and in the reception signal path (in the RX channel). The transmission signal sm'(t) (cf. FIG. 2) which is emitted by the TX antenna 5 is generated by amplifying the LO signal $s_{LO}(t)$, for example using the RF power amplifier 102, and is therefore only an amplified version of the LO signal $s_{LO}(t)$. The phase shifter 103 contained in the TX channel TX1 may additionally adapt the phase of the transmission signal $s_{RF}(t)$ by a phase shift $\Delta\phi_{TX1}$. The output of the amplifier 102 may be coupled to the TX antenna 5 (possibly via a passive matching network). The RF radar signal $y_{RF}(t)$, which is received by the RX antenna 6, is supplied to the receiver circuit in the RX channel and therefore directly or indirectly to the RF port of the mixer 104. In the present example, the received RF radar signal $y_{RF}(t)$ (antenna signal) is preamplified using the amplifier 105 (gain g). The amplified RF reception signal $g \cdot y_{RF}(t)$ is therefore supplied to the mixer 104. The amplifier 105 may be, for example, an LNA (Low-Noise Amplifier).

The LO signal $s_{LO}(t)$ is supplied to the reference port of the mixer 104, with the result that the mixer 104 downmixes the (preamplified) RF radar signal $y_{RF}(t)$ to baseband. The resulting baseband signal (mixer output signal) is denoted $y_{BB}(t)$ in FIG. 4. This baseband signal $y_{BB}(t)$ is first of all subjected to analog further processing, wherein the analog baseband signal processing chain 20 substantially effects amplification (amplifier 22) and filtering (for example bandpass filter 21 or a combination of a high-pass filter and a low-pass filter) in order to suppress undesirable sidebands and image frequencies. The resulting analog output signal which is supplied to an analog-to-digital converter (see FIG. 3, ADC 30) is denoted y(t). Methods for the digital further processing of the output signal (digital radar signal y[n]) for the purpose of detecting radar targets (at least one of distance, speed and DoA) are known per se (for example the range-Doppler analysis) and are therefore not discussed any further here.

In the present example, the mixer 104 downmixes the preamplified RF reception signal $g \cdot y_{RF}(t)$ (that is to say the amplified antenna signal) to baseband. The mixing can be carried out in one stage (that is to say from the RF band directly to baseband) or via one or more intermediate stages (that is to say from the RF band to an intermediate frequency band and on to baseband). In this case, the reception mixer 104 effectively comprises a plurality of individual mixer stages connected in series. The mixer 104 may also be in the form of an IQ mixer which provides, as the baseband signal, a complex signal having a real part and an imaginary part. The real signal component is also referred to as the in-phase component (I) and the imaginary component is referred to as the quadrature component (Q) (therefore the name IQ mixer).

The filter 21 in the analog baseband processing chain may be implemented as a series circuit comprising a high-pass filter and a low-pass filter. These filters may be active or passive RC filters, and the filter characteristic depends, in particular, on the components (resistors and capacitors) from which the filter is constructed (in the case of active filters, an amplifier is generally also included). These components have production-related tolerances, which is why the filter characteristic may differ from a theoretical filter characteristic. In some implementations, the cut-off frequencies of the high-pass and low-pass filters may vary in the various RX channels. This is problematic because the production-related deviations of the cut-off frequencies (and therefore the filter characteristic) may differ in each reception channel, which results in errors when detecting radar targets. The following text describes a concept which allows—for each RX channel and based on a mathematical model of the baseband filters—the effect of the production-related deviations of the filter cut-off frequencies from their theoretical target values on the phase of the respective baseband signal to be determined, thus making it possible to correct the phase during the subsequent digital signal processing.

An approach for determining the phase response of the baseband signal processing chain of the reception channel RX1 is described below. It goes without saying that, in the case of MIMO systems, this approach can be carried out for each reception channel. The RX channel RX1 in FIG. 5 differs from the RX channel from FIG. 4 only by virtue of the coupler 106 which makes it possible to feed a test signal $s_{TEST}(t)$ into the RF signal path in addition to the antenna signal from the antenna 6. This process of feeding in the test signal is carried out, for example, as part of an End-of-Line test (EOL test). The mixer 104 and the subsequent baseband signal processing chain 20 process the test signal $s_{TEST}(t)$ in the same manner as an antenna signal. Various suitable coupler types are known per se, for example Branch-Line couplers, Tapered-Line couplers, Rat-Race couplers, etc.

Figure 5:
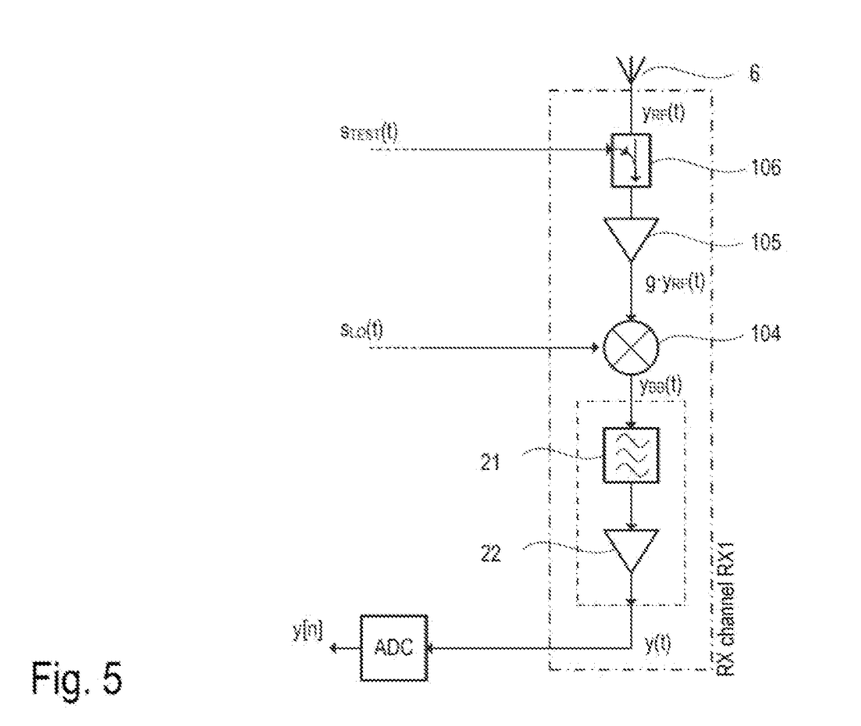
FIG. 5 illustrates the process of feeding a test signal into a reception channel of a radar system for the purpose of measuring the magnitude response of the analog baseband processing chain.

It is assumed below that the test signal $s_{TEST}(t)$ is a CW signal and the frequency $f_{TEST}$ of the test signal differs from the frequency $f_{LO}$ of the LO signal $s_{LO}(t)$ by a defined frequency offset $f_X$, that is to say $f_{TEST}=f_{LO}+f_X$. This means that the baseband signal $y_{BB}(t)$ based on the test signal $s_{TEST}(t)$ has the frequency $f_X$ (in the absence of an antenna signal). That is to say, the baseband filter 21 "sees" a CW signal at the frequency $f_X$. In some radar systems, it may be possible, as an alternative to the RF test signal $s_{TEST}(t)$, to directly feed a baseband signal at the frequency $f_X$ into the baseband signal processing chain. The coupler 106 is not required in this case.

The baseband signal $y_{BB}(t)$ at the frequency $f_X$ is attenuated by the high-pass and low-pass filters in the baseband signal processing chain in accordance with the filter characteristic. The output signal y(t) from the baseband signal processing chain 20 is digitized (see FIG. 5, ADC 30) and the amplitude of the resulting digital signal y[n] can be determined using digital signal processing. The amplitude A of the digital signal y[n] is practically directly proportional to the amplitude of the output signal y(t).

In order to determine the cut-off frequencies of the high-pass and low-pass filter components of the baseband filter 21, the frequency $f_X$ is varied (for example in stages) and the resulting amplitude A of the digital signal y[n] is determined for a multiplicity of different frequency values for $f_X$. This procedure is illustrated, by way of example, in FIG. 6. The frequency-dependent amplitude $A(f_X)$—that is to say the magnitude response—of the baseband processing chain is determined point-by-point for a multiplicity of values of $f_X$. The cut-off frequencies $F_{C1}$ and $f_{C2}$ can be determined from the magnitude response $|A(f_X)|$ determined in this manner. These are those frequencies at which the amplitude has fallen, for example by 6 dB (that is to say by approximately a factor of 2). That is to say, $|A(f_{C1})|/A_0=|A(f_{C2})|/A_0=\frac{1}{2}$, where $f_{C1}<f_{C2}$ and $A_0$ denotes the amplitude at the 0 dB line (see FIG. 6). It goes without saying that it is also possible to determine other characteristic values of the magnitude response instead of the 6 dB cut-off frequencies. Another characteristic value or threshold value is, for example, the 3 dB cut-off frequency. The magnitude response is also referred to as the amplitude response. A frequency response is usually understood as meaning a spectrum which is composed of a magnitude response and phase response. The measured magnitude response information therefore represents the characteristic profile of the magnitudes of the amplitudes $A(f_X)$ based on the frequency.

Figure 6:
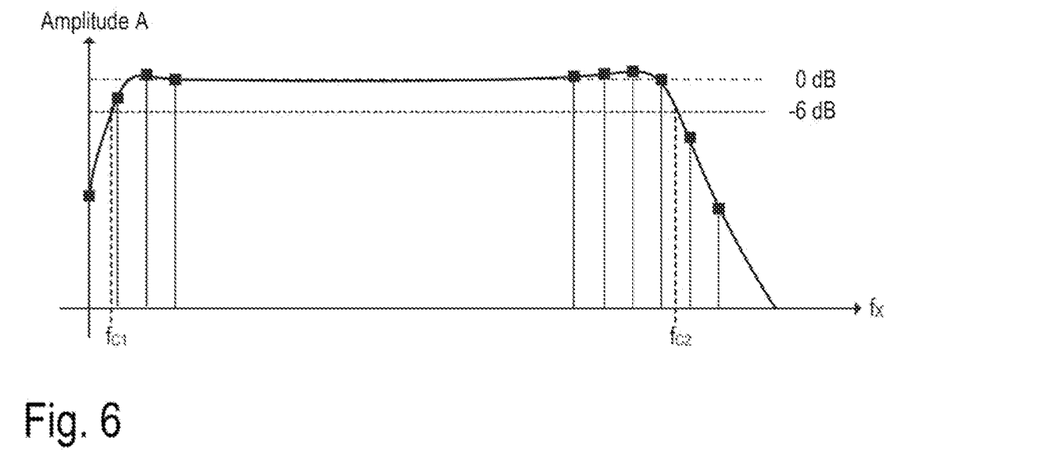
FIG. 6 illustrates, by way of example, a magnitude response of the baseband processing chain that is measured point-by-point and the upper and lower cut-off frequencies. A phase response can be determined from the cut-off frequencies based on a model.

The determined characteristic values (for example cut-off frequencies $f_{C1}$ and $f_{C2}$) can be used to determine the phase response of the baseband signal processing chain 20 using a model of the baseband signal processing chain 20. The phase response is substantially dominated by the phase response of the baseband filter 21 mentioned. The cut-off frequencies $f_{C1}$ and $f_{C2}$ are parameters of the (mathematical) model of the filters which has been mentioned. If the model is determined by the parameters $f_{C1}$ and $f_{C2}$, the phase response of the filter (or of the filter stages contained therein) can be directly calculated therefrom. For example, the filter 21 may be a bandpass filter which consists of a series circuit comprising a first-order high-pass filter and a sixth-order low-pass filter (other filter arrangements are naturally also possible). The model of the high-pass filter can be clearly determined by the frequency $f_{C1}$ and the model of the low-pass filter can be clearly determined by the frequency $f_{C2}$. The phase response of the entire filter 21 can be calculated in a manner known per se from the models (that is to say the transfer functions) of the high-pass and low-pass filters.

The transfer functions $T_{HP}(j\cdot w)$ and $T_{LP}(j\cdot w)$ respectively characterize the high-pass filter and the low-pass filter of the analog baseband signal processing chain (j denotes the imaginary unit and $w=2\pi f$ denotes the angular frequency). The product $T_{LP}(j\cdot w)\cdot T_{HP}(j\cdot w)$ characterizes the series circuit comprising the two filter stages (high-pass filter and low-pass filter) in the filter 21. The transfer functions $T_{LP}(j\cdot w)$ and $T_{HP}(j\cdot w)$ may each be assigned a phase response, which are $F_{LP}(w)=\arg\{T_{LP}(j\cdot w)\}$ and $F_{HP}(w)=\arg\{T_{HP}(j\cdot w)\}$. These transfer functions model the filter stages of the filter 21 for a nominal cut-off frequency $f_{REF1}$ or $f_{REF2}$. The specific phase responses $F_{LP,k}(w)$ and $F_{HP,k}(w)$ for a particular RX channel RXk can be determined from the measured cut-off frequencies $f_{C1,k}$ and $f_{C2,k}$ as follows (the index k denotes that RX channel):

$$F_{LP,k}(w)=F_{LP}(w\cdot f_{C1,k}/f_{REF1}),$$

$$F_{HP,k}(w)=F_{HP}(w\cdot f_{C2,k}/f_{REF2}).$$

The overall phase response $F_k(w)$ for the channel RXk results in the present example from the sum $F_k(w)=F_{LP,k}(w)+F_{HP,k}(w)$ (total phase distortion caused by the channel RXk).

According to the concept described above, a phase response can be determined for each RX channel of the radar system. The phase responses of the individual RX channels will differ (slightly) on account of production-specific scattering/tolerances. During radar operation, the information relating to the phase responses can be used to compensate for the phase differences between the individual RX channels. This compensation is carried out, for example, using digital signal processing. In the conventional range-Doppler analysis, the phase responses specific to each RX channel can be taken into account following the first Fourier transformation in the frequency domain.

The calibration of the phase distortion caused by a channel RXk during normal radar operation as part of the digital post-processing is discussed in more detail below. The phase distortion $F_k(w)$ caused by the channel RXk corresponds to the following transfer function $H(j\cdot w)$:

$$H(j\cdot w)=\exp(j\cdot F_k(w)),$$

wherein this transfer function $H(j\cdot w)$ can be assigned an inverse transfer function $$\overline{H}(j\cdot w)=\exp(-j\cdot F_k(w)),$$

where $H(j\cdot w)\cdot\overline{H}(j\cdot w)=1$. The "1" may be considered here to be a reference transfer function. It goes without saying that any desired other reference may also be used (which, however, is the same for each reception channel). The output signal y(t) from the relevant RX channel RXk comprises a phase distortion which is caused by the analog baseband signal processing chain and can be described by the transfer function $H(j\cdot w)$. In the frequency domain, this phase distortion can be eliminated by multiplying it by the inverse transfer function $\overline{H}(j\cdot w)$, that is to say:

$$\overline{Y}(j\cdot w)=Y(j\cdot w)\cdot\overline{H}(j\cdot w)=Y(j\cdot w)\cdot\exp(-j\cdot F_k(w)),$$

where $Y(j\cdot w)$ denotes the Fourier transform of the output signal y(t) ($Y(j\cdot w)=F\{y(t)\}$, the operator F denotes the Fourier transformation) and $\overline{Y}(j\cdot w)$ denotes the Fourier transform of the modified output signal $\overline{y}(t)$ in which the phase distortion of the analog frontend has been compensated for. This process can also be referred to as phase equalizing, where $\exp(-j\cdot F_k(w))$ is the equalizing function. At this point, it should be noted that the multiplication by the transfer function $\overline{H}(j\cdot w)$ used for the equalizing is virtually a multiplication by a window function in the frequency domain. That is to say, the phase equalizing can be implemented without any additional computing complexity if the transfer function $\overline{H}(j\cdot w)$ used for the equalizing is calculated into a window function of the next transformation stage (also called Doppler FFT) which is used anyway. It goes without saying that the windowing can be carried out not only in the frequency domain but also in the time domain. Both variants are mathematically equivalent.

The phase equalizing can be efficiently carried out in the digital domain since, during normal radar operation, the output signals y(t) from the individual RX channels are subjected to Fourier transformation anyway. The above equation can be written as follows in the digital domain:

$$\overline{Y}[u] = Y[u] \cdot \overline{H}[u] = Y[u] \cdot \exp(-j \cdot F_k[u]), \text{ where}$$

$$F_k[u] = F_k(u/T_S).$$

In the above equation, u denotes the digital frequency and $T_S$ denotes the sampling time interval. The discrete Fourier transform Y[u] of the digital radar signal y[n] (see FIG. 5) can be calculated, for example, using the FFT algorithm (FFT=Fast Fourier Transform). $\overline{Y}[u]$ denotes the discrete Fourier transform of the modified output signal $\overline{y}(t)$. When using a windowed FFT, the phase equalizing can be taken into account in the window function, as mentioned above.

The concept described above is schematically illustrated in FIG. 7. The digital radar signals $y_k[n]$ (k denotes the RX channel RXk, where k=1, . . . , K) provided by the RX channels are evaluated using a range-Doppler analysis. In one example implementation, the digital radar signals $y_k[n]$ are preprocessed in a digital frontend DFE before the actual range-Doppler analysis. The digital frontend DFE contains a digital filter for each RX channel, for example, and may optionally also include sampling rate conversion.

Figure 7:
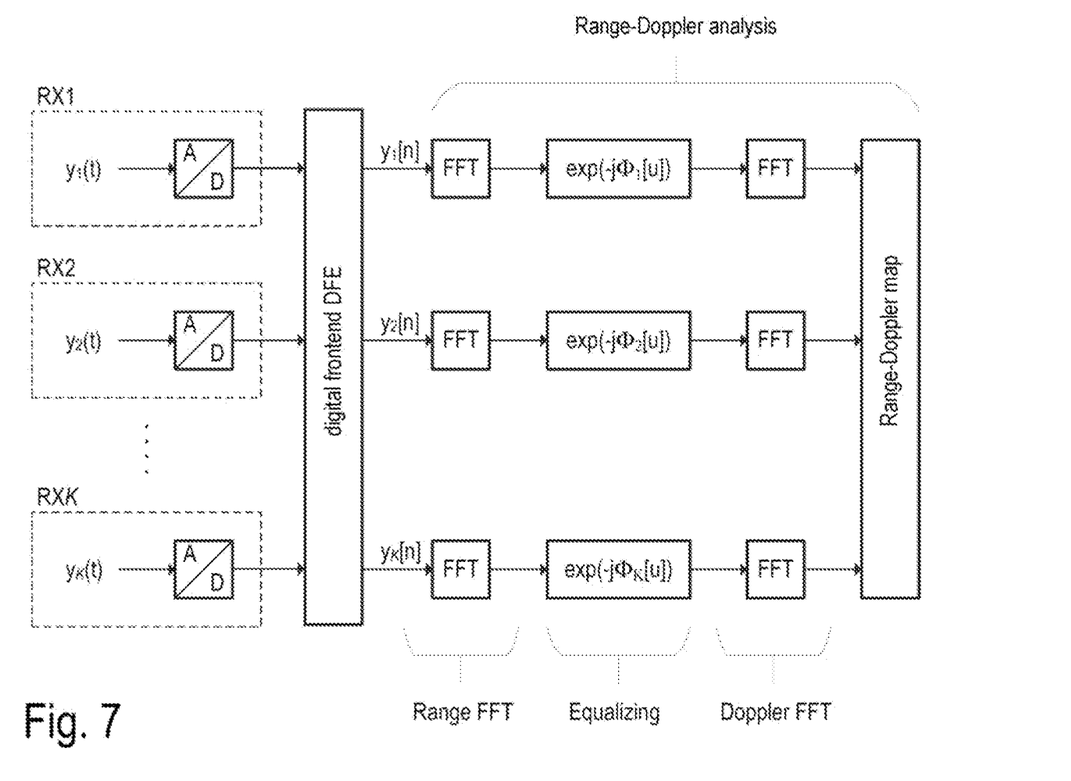
FIG. 7 illustrates, based on an example block diagram, the phase equalizing based on the phase responses determined for the reception channels during regular radar operation.

During the range-Doppler analysis, the digital radar signals $y_k[n]$ (possibly preprocessed in the DFE) are transformed to the frequency domain in a first transformation stage (also called range FFT). At this point, the equalizing described above can be inserted. The modified signals $\overline{Y}[u]$ (in the frequency domain) are then supplied to a second transformation stage (also called Doppler FFT). The result is a two-dimensional array of complex numerical values, which is also known by the term "Range Doppler Map".

Since the equalizing is carried out for all channels having the same model-based phase response $F_k(w) = F_{LP}(w \cdot f_{C1,k}/f_{REF1}) + F_{LP}(w \cdot F_{C2,k}/f_{REF2})$ (DEPENDENT ON THE MEASURED parameters $f_{C1}$ and $f_{C2}$), phase differences which are caused by the analog frontend between the individual digital radar signals $y_k[n]$ are compensated for/equalized by the equalizing.

Figure 8:
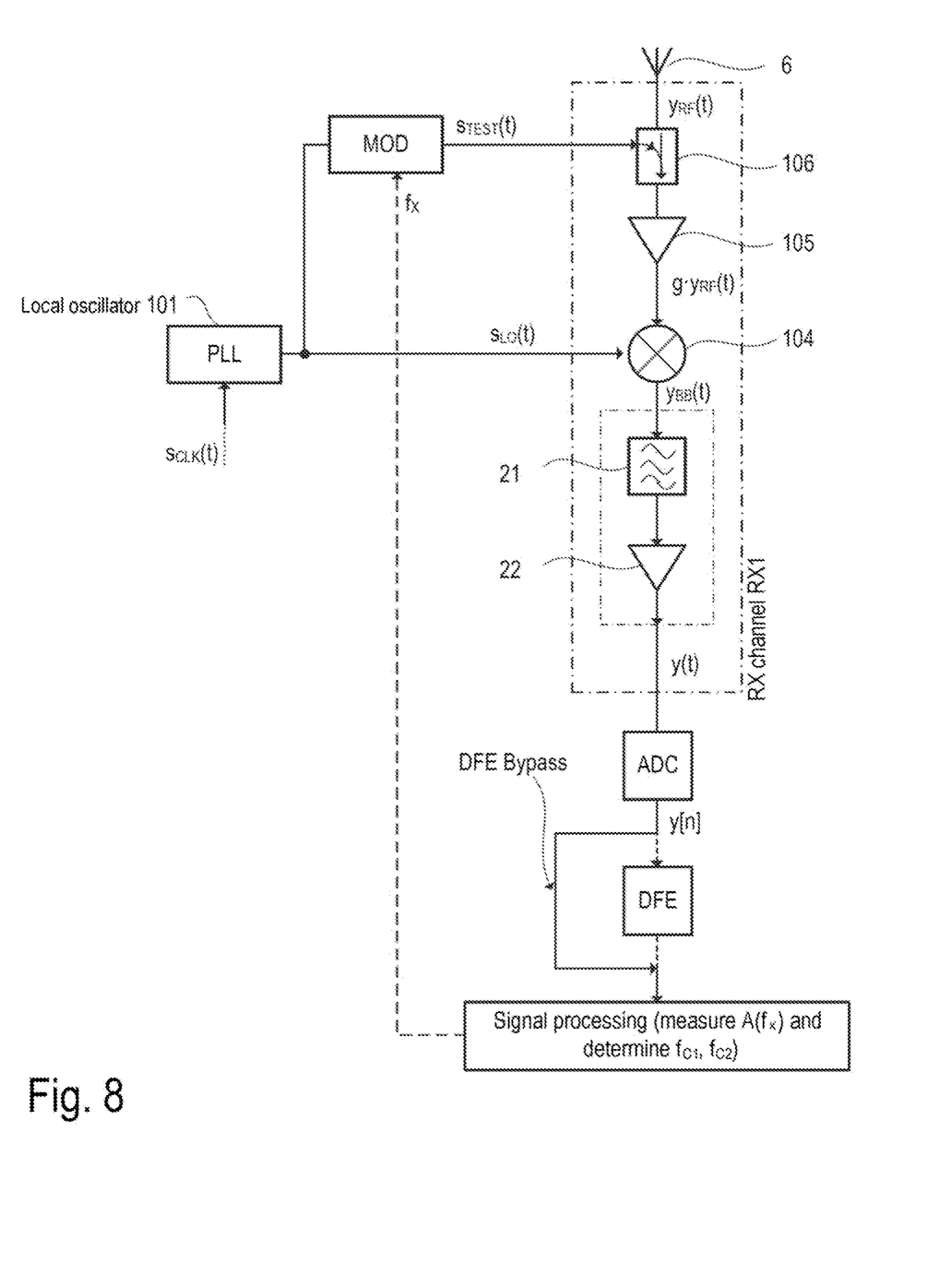
FIG. 8 illustrates a development of the example from FIG. 5.

FIG. 8 illustrates the example from FIG. 5 in more detail. Only the differences between FIG. 5 and FIG. 8 are discussed below; for the rest, reference is made to the above description of FIG. 5. According to FIG. 8, a modulator MOD is provided and is configured to modulate the LO signal $s_{LO}(t)$ at the frequency $f_X$. The RF test signal $s_{TEST}(t)$ therefore has (depending on the type of modulation) the sum frequency $f_{LO}+f_X$, for example, and the resulting baseband signal $y_{BB}(t)$ (output signal from the mixer 104) likewise contains a component at the frequency $f_X$. The corresponding digital signal y[n] likewise contains a signal component at the frequency $f_X$.

In the example illustrated, the digital frontend DFE is bridged (bypassed) during the measurement of the magnitude response $A(f_X)$ in order to avoid distorting the measurement result. In contrast, during normal radar operation (that is to say when detecting radar targets), the digital frontend is active (that is to say is not bridged, see FIG. 7).

Figure 9:
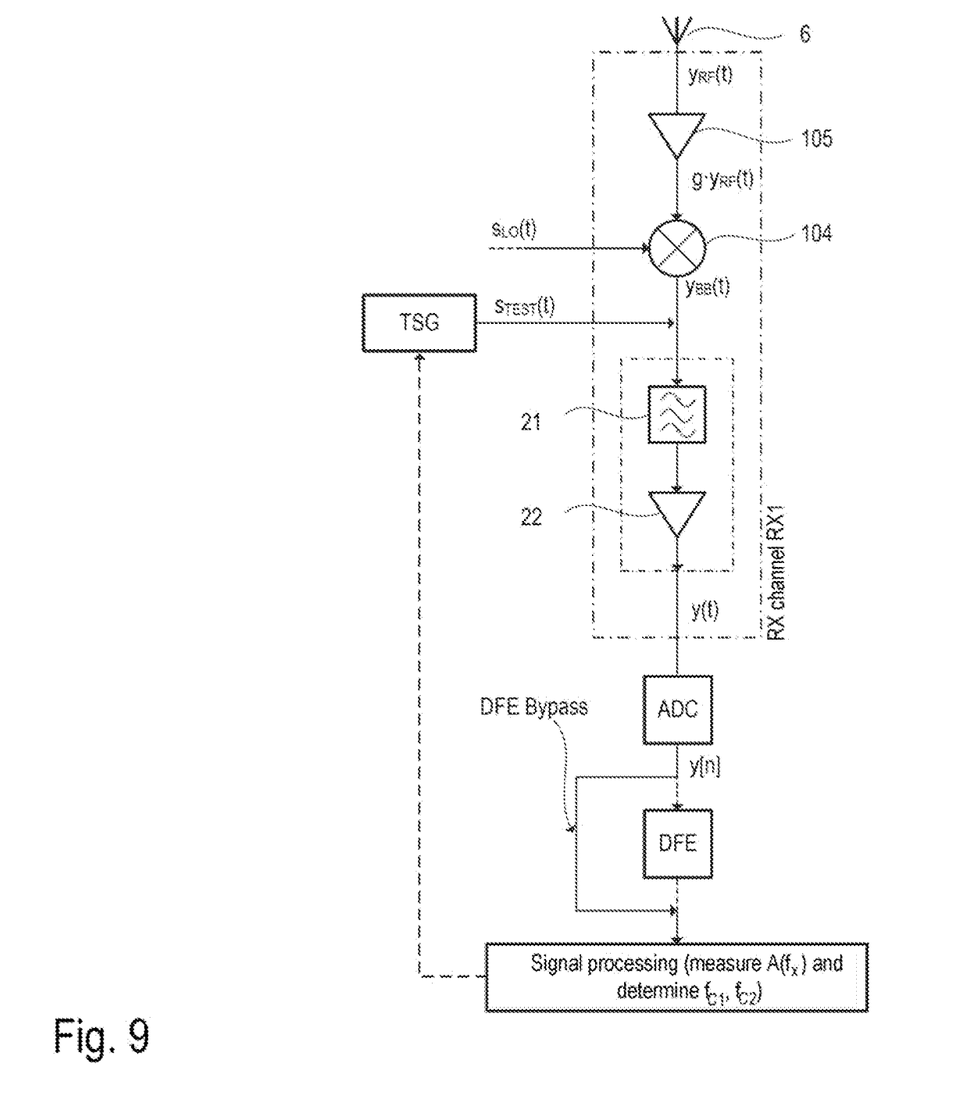
FIG. 9 illustrates an alternative to the example from FIG. 8.

FIG. 9 illustrates a modification of the example from FIG. 8. Only the differences between FIG. 8 and FIG. 9 are discussed below. Unlike in the previous example, the test signal $s_{TEST}(t)$ is not an RF signal, but rather a baseband signal having a signal component at the frequency $f_X$. The test signal $s_{TES}(t)$ may therefore be a sinusoidal signal at the frequency, which is directly fed into the analog baseband signal processing chain 20 (instead of the mixer output signal). The coupler 106 from FIG. 8 is not needed in this case. Instead of gradually changing the frequency $f_X$ and sequentially determining the associated magnitudes $|A(f_X)|$ (that is to say for $f_X = \{f_{X1}, f_{X2}, \ldots\}$), the test signal $s_{TEST}(t)$ may also comprise a plurality of frequency components $f_{X1}$, $f_{X2}$, etc. (multi-tone signal). In this case, the determination of the magnitudes $|A(f_{X1})|$, $|A(f_{X2})|$ is somewhat more complex, but can be carried out in one process.

Figure 10:
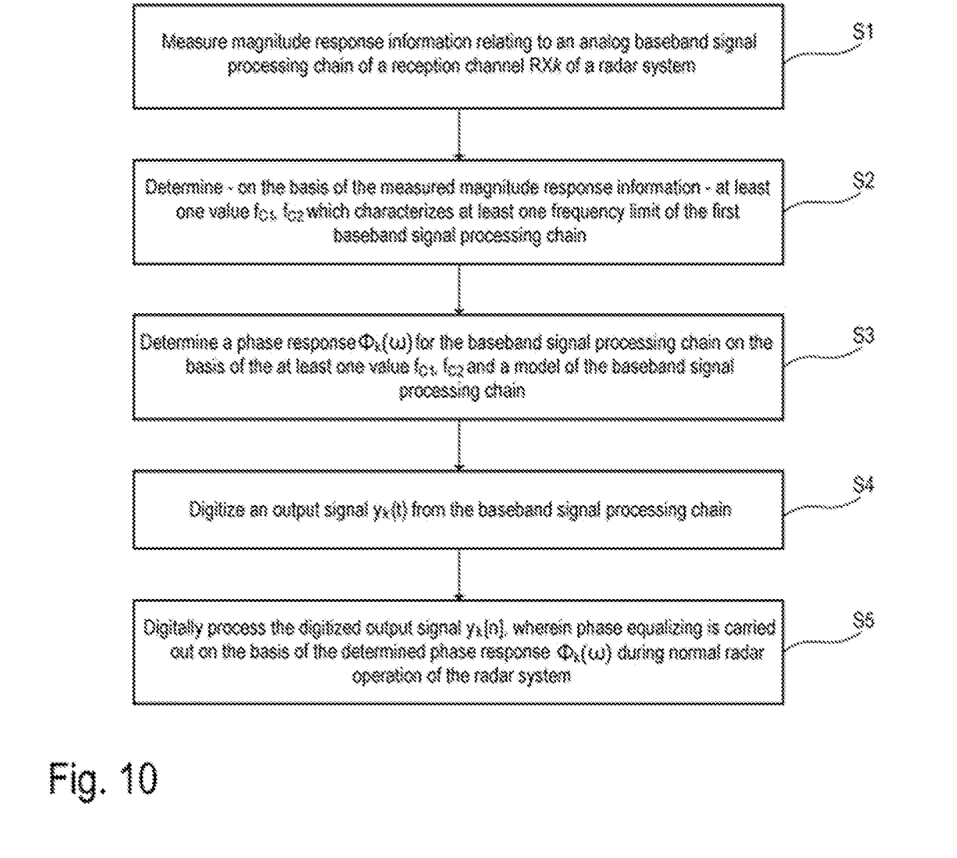
FIG. 10 is a flowchart for illustrating an example of the methods described here.

The above-described functions for calibrating the analog signal processing chain of a radar reception channel are summarized in the flowchart from FIG. 10. According to FIG. 10, the method comprises measuring magnitude response information relating to an analog baseband signal processing chain (see, for example, FIG. 5, signal processing chain 20) of a reception channel RXk (k=1, 2, etc.) of a radar system (see FIG. 10, step S1). The method also comprises determining—based on the measured magnitude response information—at least one value (see, for example, FIG. 6, cut-off frequencies $f_{C1}$, $f_{C2}$) which characterizes at least one frequency limit of the first baseband signal processing chain (see FIG. 10, step S2), and determining a phase response $F_k(w)$ for the baseband signal processing chain based on the at least one value (for example cut-off frequencies $f_{C1}$, $f_{C2}$) and a model of the baseband signal processing chain (see FIG. 10, step S3). The method also comprises digitizing an output signal $y_k(t)$ (k=1, 2, etc.) from the baseband signal processing chain (see FIG. 10, step S4) and digitally processing the digitized output signal $y_k[n]$, wherein phase equalizing is carried out based on the determined phase response $F_k(w)$ during normal radar operation of the radar system (see FIG. 10, step S5, and FIG. 7).

The method depicted in FIG. 10 can be carried out for some or all reception channels RXk of the radar system. Differences in the phase responses $F_k(w)$ of the respective baseband signal processing chains are compensated for by the phase equalizing during normal radar operation of the radar system.

What is claimed is:

1. A method comprising:
   measuring magnitude response information relating to a first analog baseband signal processing chain, of a first reception channel of a radar system, and to a second analog baseband signal processing chain of a second reception channel of the radar system,
      wherein the first analog baseband signal processing chain comprises a first filter comprising a first low-pass filter and a first high-pass filter, and
      wherein the second analog baseband signal processing chain comprises a second filter comprising a second low-pass filter and a second high-pass filter;
   determining, based on the measured magnitude response information relating to the first analog baseband signal processing chain, a first upper cut-off frequency and a first lower cut-off frequency, of the first low-pass filter and the first high-pass filter, which together characterize a frequency limit of the first analog baseband signal processing chain;
   determining, based on the measured magnitude response information relating to the first analog baseband signal processing chain, a second upper cut-off frequency and a second lower cut-off frequency, of the second low-pass filter and the second high-pass filter, which together characterize the frequency limit of the second analog baseband signal processing chain;
   determining a first phase response for the first analog baseband signal processing chain based on the first upper cut-off frequency, the first lower cut-off frequency, and a model of the first analog baseband signal processing chain;

determining a second phase response for the second analog baseband signal processing chain based on the second upper cut-off frequency, the second lower cut-off frequency, and a model of the second analog baseband signal processing chain;

digitizing a first output signal, from the first analog baseband signal processing chain, and a second output signal, from the second analog baseband signal processing chain; and compensating for differences in the first phase response and the second phase response based on digital signal processing of the digitized first output signal and the digitized second output signal during a normal radar operation of the radar system.

2. The method as claimed in claim 1,
wherein the magnitude response information is measured during an end-of-line test.

3. The method as claimed in claim 1, wherein measuring the magnitude response information comprises:
feeding a baseband signal, at a defined frequency, into the first analog baseband signal processing chain and the second analog baseband signal processing chain,
determining, based on feeding the baseband signal into the first analog baseband signal processing chain and the second analog baseband signal processing chain, a first amplitude magnitude of the first output signal from the first analog baseband signal processing chain, and a second amplitude magnitude of the second output signal from the first analog baseband signal processing chain, and
repeating measuring the magnitude response information for a multiplicity of further frequencies.

4. The method as claimed in claim 3, wherein feeding the baseband signal into the first analog baseband signal processing chain and the second analog baseband signal processing chain comprises:
generating a radio frequency (RF) test signal; and
mixing the RF test signal with the baseband signal with an aid of a local oscillator signal of the radar system.

5. The method as claimed in claim 1, wherein measuring the magnitude response information comprises:
feeding a multi-tone baseband signal, which has a multiplicity of defined frequencies, into the first analog baseband signal processing chain and the second analog baseband signal processing chain; and
determining, based on feeding the multi-tone baseband signal into the first analog baseband signal processing chain and the second analog baseband signal processing chain, a first amplitude magnitude of the first output signal from the first analog baseband signal processing chain, and a second amplitude magnitude of the second output signal from the second analog baseband signal processing chain.

6. The method as claimed in claim 1, further comprising:
transforming the digitized first output signal and the digitized second output signal to a frequency domain using a windowed Fourier transformation using window functions during the normal radar operation of the radar system,
wherein the window functions depend on the first phase response and the second phase response.

7. The method as claimed in claim 6, further comprising:
transforming, after transforming digitized first output signal and the digitized second output signal to the frequency domain using the windowed Fourier transformation, the digitized first output signal and the digitized second output signal transformed using a further Fourier transformation to determine a range-Doppler map.

8. The method as claimed in claim 1,
wherein each of the first analog baseband signal processing chain and the second analog baseband signal processing chain has a high-pass z characteristic and a low-pass filter characteristic, and
wherein each of the first phase response and the second phase response represents a superimposition of a high-pass filter phase response and a low-pass filter phase response.

9. The method as claimed in claim 1,
wherein the first reception channel is integrated in a first radar chip and the second reception channel is integrated in a second radar chip.

10. The method as claimed in claim 1,
wherein the magnitude response information is measured using digital signal processing of the digitized first output signal and the digitized second output signal, and
wherein a digital frontend is bridged when the magnitude response information is measured, and the digital frontend is not bridged when compensating for differences in the first phase response and the second phase response.

11. A method comprising:
measuring magnitude response information relating to an analog baseband signal processing chain of a reception channel of a radar system;
determining, based on the measured magnitude response information, an upper cut-off frequency and a lower cut-off frequency which together characterize a frequency limit of the analog baseband signal processing chain;
determining a phase response for the analog baseband signal processing chain based on the upper cut-off frequency, and the lower cut-off frequency, and a model of the analog baseband signal processing chain, wherein the upper cut-off frequency is a parameter of the model of the analog baseband signal processing chain;
digitizing an output signal from the analog baseband signal processing chain; and
digitally processing the digitized output signal, wherein phase equalizing is carried out based on the phase response during a normal radar operation of the radar system.

12. The method as claimed in claim 11, wherein digitally processing the digitized output signal comprises:
transforming the digitized output signal to a frequency domain in a first Fourier transformation stage,
applying a window function to the transformed digitized output signal and subsequently using a second Fourier transformation stage,
wherein the window function depends on the phase response.

13. The method as claimed in claim 12,
wherein, before the first Fourier transformation stage, the digitized output signal is preprocessed in a digital frontend, and
wherein the digital frontend is bridged when measuring the magnitude response information.

14. A radar system, comprising:
one or more processors, configured to:
- measure magnitude response information relating to a first analog baseband signal processing chain, of a first reception channel of a radar system, and to a second analog baseband signal processing chain of a second reception channel of the radar system,
  - wherein the first analog baseband signal processing chain comprises a first filter comprising a first low-pass filter and a first high-pass filter, and
  - wherein the second analog baseband signal processing chain comprises a second filter comprising a second low-pass filter and a second high-pass filter;
- determine, based on the measured magnitude response information relating to the first analog baseband signal processing chain, a first upper cut-off frequency and a first lower cut-off frequency, of the first low-pass filter and the first high-pass filter, which together characterize a frequency limit of the first analog baseband signal processing chain;
- determine, based on the measured magnitude response information relating to the first analog baseband signal processing chain, a second upper cut-off frequency and a second lower cut-off frequency, of the second low-pass filter and the second high-pass filter, which together characterize the frequency limit of the second analog baseband signal processing chain;
- determine a first phase response for the first analog baseband signal processing chain based on the first upper cut-off frequency, the first lower cut-off frequency, and a first model of the first analog baseband signal processing chain;
- determine a second phase response for the second analog baseband signal processing chain based on the second upper cut-off frequency, the second lower cut-off frequency, and a second model of the second analog baseband signal processing chain;
- digitize a first output signal, from the first analog baseband signal processing chain, and a second output signal, from the second analog baseband signal processing chain; and
- compensate for differences in the first phase response and the second phase response based on digital signal processing of the digitized first output signal and the digitized second output signal during a normal radar operation of the radar system.

15. The radar system as claimed in claim 14,
wherein the first upper cut-off frequency and the first lower cut-off frequency are parameters of the first model, and wherein the second upper cut-off frequency and the second lower cut-off frequency are parameters of the second model.

16. The radar system as claimed in claim 14,
wherein the first upper cut-off frequency and the first lower cut-off frequency correspond to a low-pass filter of the radar system, and wherein the second upper cut-off frequency and the second lower cut-off frequency correspond to a high-pass filter of the radar system.

17. The radar system as claimed in claim 14,
wherein the magnitude response information is measured during an end-of-line test.

18. The radar system as claimed in claim 14, wherein, to measure the magnitude response information, the one or more processors are configured to:
- feed a baseband signal, at a defined frequency, into the first analog baseband signal processing chain and the second analog baseband signal processing chain,
- determine, based on feeding the baseband signal into the first analog baseband signal processing chain and the second analog baseband signal processing chain, a first amplitude magnitude of the first output signal from the first analog baseband signal processing chain, and a second amplitude magnitude of the second output signal from the first analog baseband signal processing chain, and
- repeat measuring the magnitude response information for a multiplicity of further frequencies.

19. The radar system as claimed in claim 14, wherein, to measure the magnitude response information, the one or more processors are configured to:
- feed a multi-tone baseband signal, which has a multiplicity of defined frequencies, into the first analog baseband signal processing chain and the second analog baseband signal processing chain; and
- determine, based on feeding the multi-tone baseband signal into the first analog baseband signal processing chain and the second analog baseband signal processing chain, a first amplitude magnitude of the first output signal from the first analog baseband signal processing chain, and a second amplitude magnitude of the second output signal from the second analog baseband signal processing chain.

20. The radar system as claimed in claim 14, wherein the one or more processors are further configured to:
- transform the digitized first output signal and the digitized second output signal to a frequency domain using a windowed Fourier transformation using window functions during the normal radar operation of the radar system,
  - wherein the window functions depend on the first phase response and the second phase response.

* * * * *